(12) United States Patent
Mourey

(10) Patent No.: US 11,585,369 B1
(45) Date of Patent: Feb. 21, 2023

(54) INSULATED BLANKET HOOK AND STRAP

(71) Applicant: Aaron T. Mourey, Ebensburg, PA (US)

(72) Inventor: Aaron T. Mourey, Ebensburg, PA (US)

( * ) Notice: Subject to any disclaimer, the term of this patent is extended or adjusted under 35 U.S.C. 154(b) by 0 days.

(21) Appl. No.: 17/568,653

(22) Filed: Jan. 4, 2022

Related U.S. Application Data

(60) Provisional application No. 63/146,235, filed on Feb. 5, 2021.

(51) Int. Cl.
*F16B 45/00* (2006.01)
*H02G 1/00* (2006.01)

(52) U.S. Cl.
CPC .............. *F16B 45/008* (2021.05); *H02G 1/00* (2013.01)

(58) Field of Classification Search
CPC ...... F16B 45/06; F16B 45/002; F16B 45/008; F16B 19/06; G09F 7/18; G09F 2007/1839; H01B 3/28; H01R 43/00; H02G 1/00; H02G 1/02; H02G 1/04; H02G 1/14; H02G 7/05; A47G 33/10
See application file for complete search history.

(56) References Cited

U.S. PATENT DOCUMENTS

| | | | | |
|---|---|---|---|---|
| 2,172,132 | A * | 9/1939 | Schneible | F16B 19/06 267/47 |
| 2,452,722 | A * | 11/1948 | Boothby | A61M 16/10 128/205.17 |
| 2009/0255159 | A1 * | 10/2009 | Smith | G09F 7/18 40/607.06 |
| 2010/0090544 | A1 * | 4/2010 | McQuaig | H02G 1/04 248/342 |
| 2013/0277524 | A1 * | 10/2013 | Fathi | A44B 15/005 248/308 |
| 2019/0257351 | A1 * | 8/2019 | Johnson | A47G 33/10 |

OTHER PUBLICATIONS http://thematking.com/business_industry/industrial/industrialsafetymats/boltblocker/linemans-blanket.htm article about rubber blankets.
https://www.utilityproducts.com/vehicles-accessories/article/16003471/rubber-blankets-save-lives article about rubber blanket use by linemen.
ilmatthews.com/products/salisbury-blanket-pin-sal21 catalogue showing prior art equipment.

* cited by examiner

*Primary Examiner* — Lee A Holly
(74) *Attorney, Agent, or Firm* — Karen Tang-Wai Sutton

(57) ABSTRACT

An insulated hook for use with a rubber blanket having a plurality of apertures about its perimeter, the hook having a body formed with a pair of bends between a shank and a conical tip formed at each of a proximal end and a distal end of the hook body. Each conical tip has a flaring base with a width diameter greater than a width diameter of the hook body. The diameter of the hook body and conical tip are sized and shaped to be removably received by the plurality of apertures of the blanket. The hook body is made of durable material such as nylon 6.6 capable of withstanding high temperatures and is non-electrically conductive. A method of use for the hook with an optional strap is included.

12 Claims, 5 Drawing Sheets

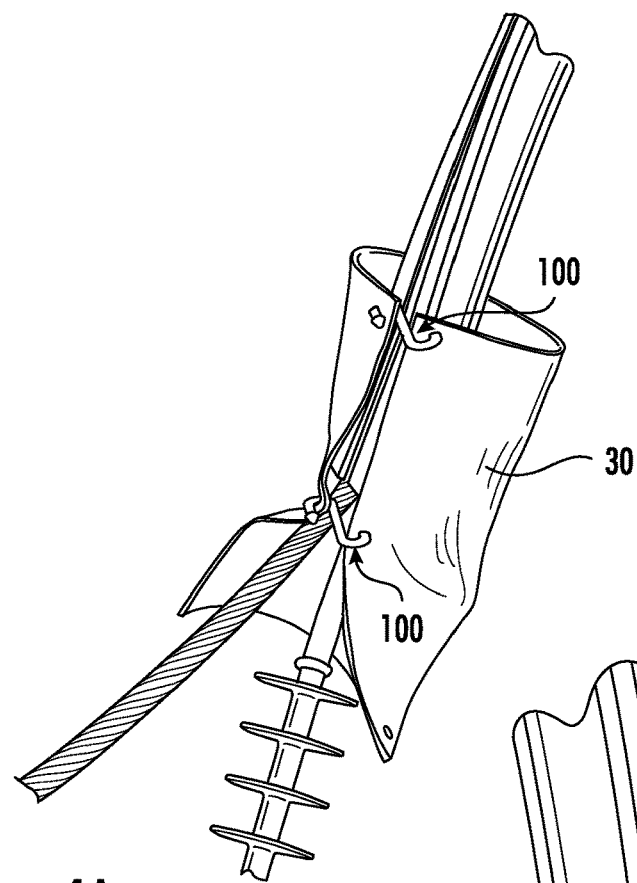
FIG. 4A
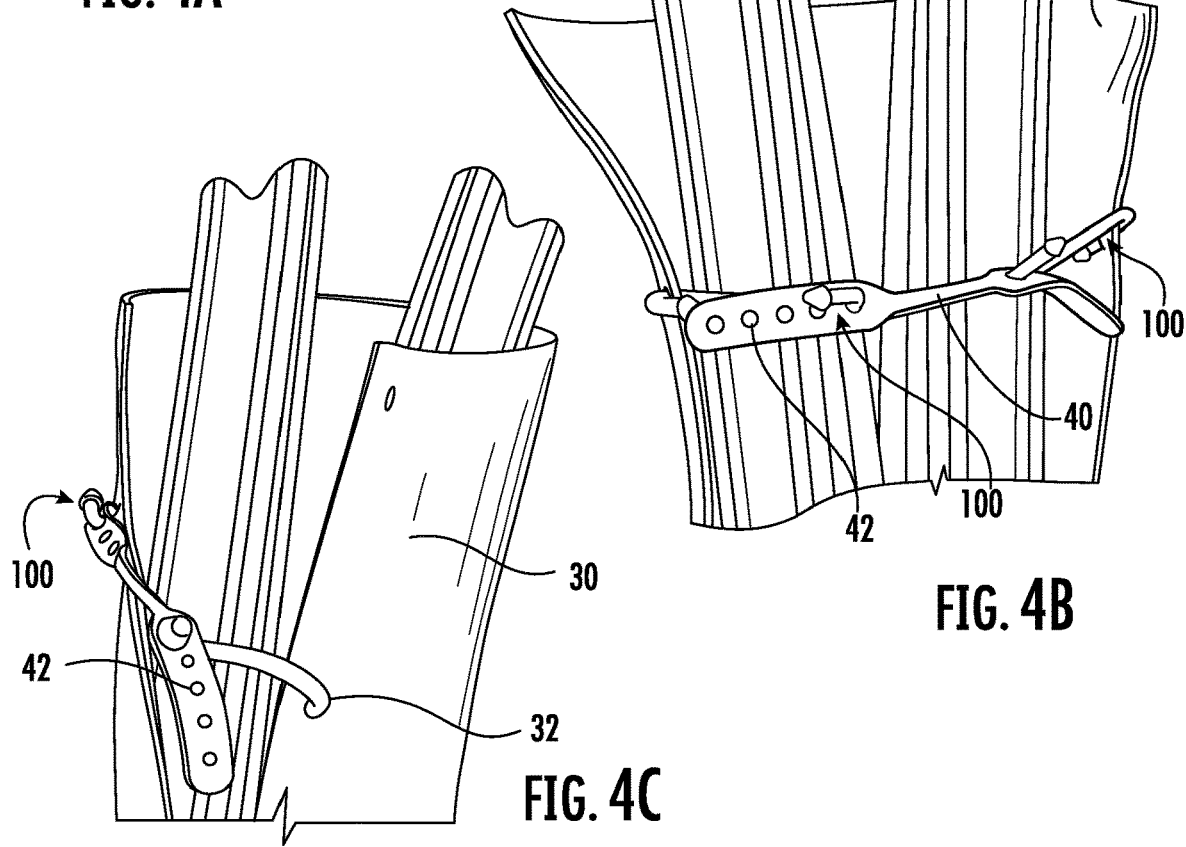
FIG. 4B
FIG. 4C

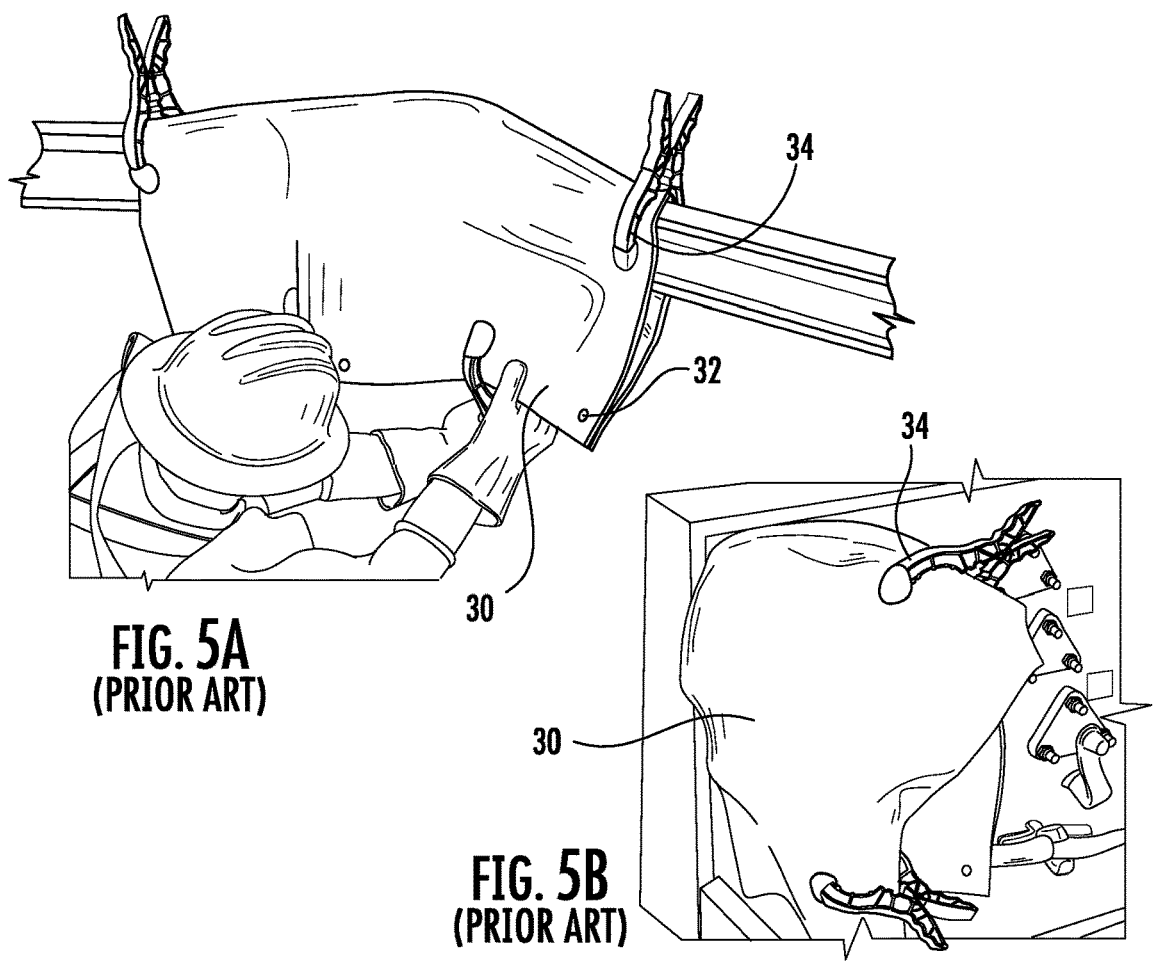
FIG. 5A
(PRIOR ART)
FIG. 5B
(PRIOR ART)
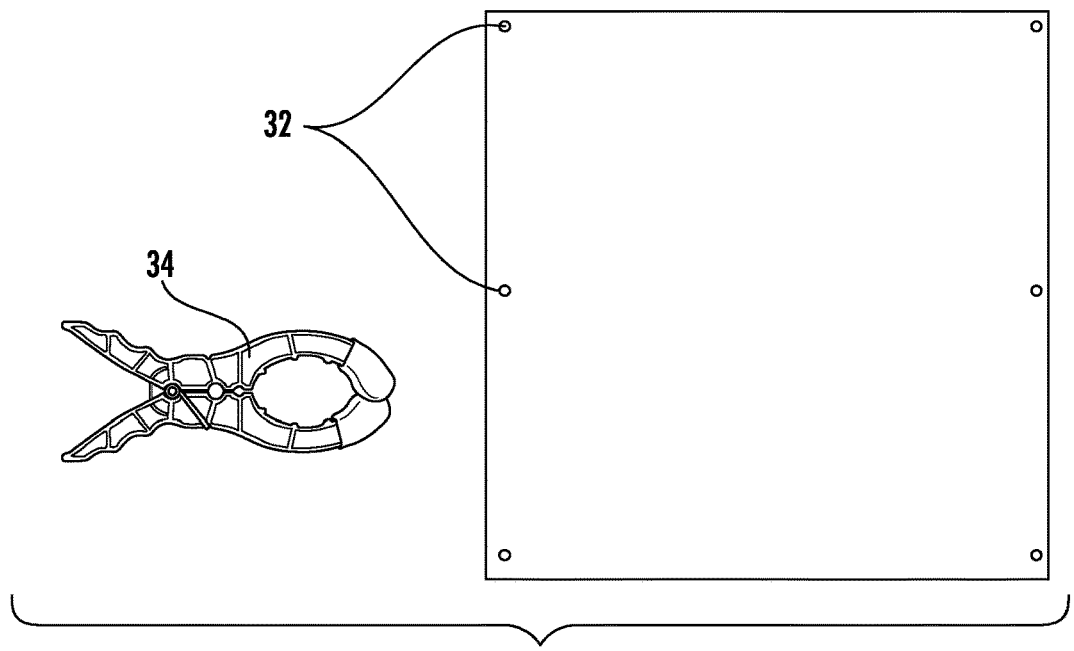
FIG. 5C
(PRIOR ART)

INSULATED BLANKET HOOK AND STRAP

CROSS-REFERENCE TO RELATED APPLICATIONS

This application is a utility of U.S. provisional patent application Ser. No. 63/146,235 filed on 5 Feb. 2021 from which priority and benefit is claimed under all applicable sections of Title 35 of the United States Code including, but not limited to, Sections 120, 121, and 365(c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The present invention pertains to the field of high voltage line safety equipment. Specifically, the invention is an insulated hook and an optional strap for securing rubber blankets around power lines and other high voltage equipment to protect linemen during installation, repair, and maintenance of electric power transmission, telecommunication and distribution lines.

Background Art

A lineman is a specialized electrician who installs, maintains, tests, and repairs both transmission and distribution lines originating from power plants and extending to individual buildings and structures. The work is dangerous because the lineman works on outdoor high-voltage electrical lines and systems, and every year, between 30-50 in 100,000 linemen are killed on the job, making this one of the top 10 most dangerous jobs in the United States. Personal protective equipment is thus vital for every lineman on the job, and a pair of insulated gloves and a rubber blanket are two of the most important pieces of protective equipment used daily.

Since linemen must wear thick, insulated gloves, all protective equipment used must be easy to handle as the gloves do not permit fine motor skills, such as securing buttons through holes or manipulating zippers, etc. The personal protective equipment is thus large, bulky and easy to handle. Thick, insulated rubber blankets are draped over an electrical line, or wrapped around equipment, and then secured by a blanket pin or clamp, which is essentially a large insulated spring clamp, and both are referred to as a "clothespin" or "blanket pin" in the industry.

The blanket pin is used to secure the loose ends of the blanket around the live wire or equipment but these pins have a tendency to become loose, or fail to hold the blankets securely around irregularly shaped or very large equipment, where multiple blankets may be necessary for safety. Linemen thus often must repeatedly adjust and secure the blankets and pins while they work, exposing them to continuing dangerous conditions. Rubber blankets are often made with holes along the perimeter of the blanket, but these holes are relatively small and it is too difficult for a lineman wearing gloves to easily thread a rope or other such means through the holes to better secure the blanket, and the blanket pins available on the market are not designed to secure the blanket through those holes but rather to pinch or grab the blanket itself and hold folds of the blanket together by the squeezing pressure of the spring clamp.

What is needed is an alternative closure apparatus to more securely attach the rubber blanket to itself and to the equipment around which the blanket is wrapped.

What is also needed is an alternative closure apparatus used to secure the rubber blanket that does not require fine motor skills and thus can be easily manipulated by a lineman wearing bulky gloves.

DISCLOSURE OF INVENTION

In a first aspect of the invention, an insulated hook for use with a rubber blanket formed with at least two apertures formed in an outermost edge of the blanket, the hook and blanket used to protecting linemen working with high voltage equipment, the hook comprising a hook body having a proximal end and a distal end, with the hook body shaped form a first bend towards the proximal end and a second bend towards the distal end, the first and second bends separated by a shank of the hook body. In one embodiment, the hook body is an s-shaped body. In another embodiment, the hook body is a c-shaped body. The first bend and the second bend each have a gape with a predetermined width. The hook body is further comprised of a hook width, a hook length, a hook diameter and a cross-sectional shape and a conical tip formed at each of the proximal end and the distal end of the hook body, the conical tip having a base with a diameter larger than the hook diameter and the conical tip sized and shaped to removably engage an aperture in a blanket used in high voltage work.

The hook body is made of a non-conductive material, typically a smooth nylon 6.6 material.

In yet another aspect of the invention, the hook body has a cross-sectional shape that is at least one of symmetrical and asymmetrical, with the cross-sectional shape having rounded edges.

In still yet another aspect of the invention, the gape of the first bend and the second bend are a same size.

In still yet another aspect of the invention, the hook is used with a strap comprising a flexible, rubber body formed with at least two apertures between a first end and an opposed second end, the apertures sized and shaped to removably receive the hook.

In another aspect of the invention, a method of temporarily insulating high voltage equipment using rubber blankets formed with a plurality of apertures around an edge of the blankets, and at least one insulated hook having a first bend and a second bend is comprised of the steps of identifying the high voltage equipment requiring temporary electrical insulation, approximating a circumference of the equipment by visually evaluating a number of blankets and hooks needed to encircle the equipment to a sufficient level to safely insulate the equipment, selecting a first blanket and wrapping the blanket around the equipment, positioning the first bend of the hook inside an aperture of the first blanket and positioning the second bend of the hook inside at least one of a second aperture of the first blanket and repeating the steps of positioning and positioning until the equipment is sufficiently enclosed by the blanket and hooks.

In still yet another aspect of the method, one or more rubber straps having apertures are included in the steps of approximating and evaluating, then after the step of positioning the first bend of the hook inside the aperture of the first blanket, the step of positioning the second bend of the hook inside one aperture of the strap followed by the step of positioning a first bend of a second hook inside another aperture of the strap prior to the step of positioning the second bend of the second hook inside another aperture of the first blanket.

BRIEF DESCRIPTION OF THE DRAWINGS

The features and advantages of the invention will become apparent from a consideration of the subsequent detailed description presented in connection with accompanying drawings, in which:

FIGS. 4A-C are perspective views the hook in FIGS. 1A-B and the strap in FIGS. 3A-B, showing a variety of representative uses of the hook and straps with a prior art rubber blanket having a plurality of preformed holes along two edges thereof, as used securing the prior art rubber blanket to common three-dimensional high voltage equipment.

FIGS. 5A-C show a prior art blanket and blanket pin, shown in two representative uses on high voltage equipment.

DRAWINGS LIST OF REFERENCE NUMERALS

Figure 1A:
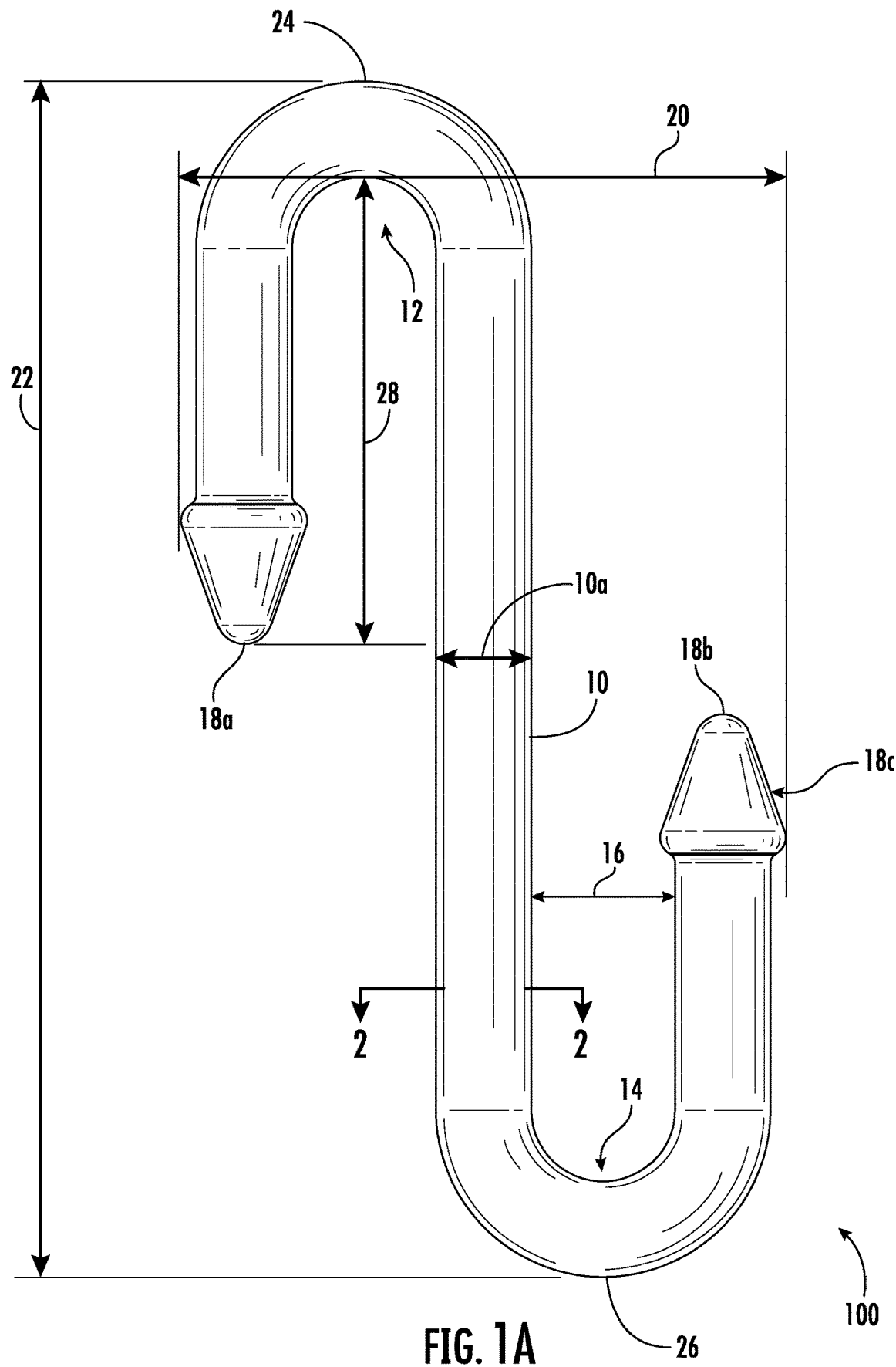
FIG. 1A is a side elevation view of an insulated blanket hook according to the invention.

The following is a list of reference labels used in the drawings to label components of different embodiments of the invention, and the names of the indicated components.
100 insulated blanket hook or hook
10 body
10a straight segment or shank
10b diameter of hook body
12 first bend
14 second bend
16 throat opening length or gape
18a proximal end
18b distal end
18c conical end
20 hook width
22 hook length
24 top end of hook
26 bottom end of hook
28 throat of hook
30 blanket
32 aperture
34 prior art blanket clamp pin or clothespin or blanket pin
40 strap
42 hole
44 strap ease segment

DETAILED DESCRIPTION

Figure 1B:
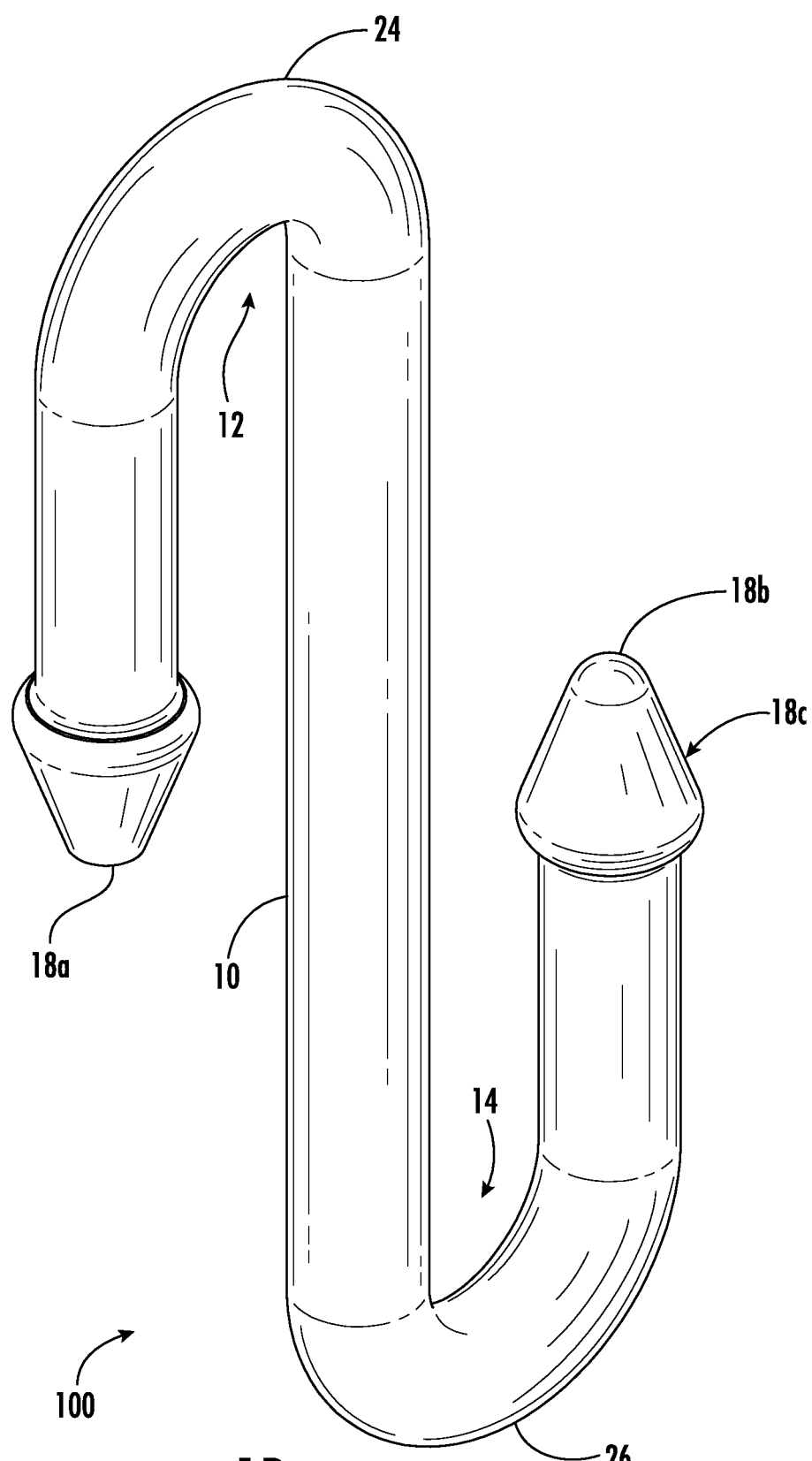
FIG. 1B is a perspective view of the hook in FIG. 1A.
Figure 2:
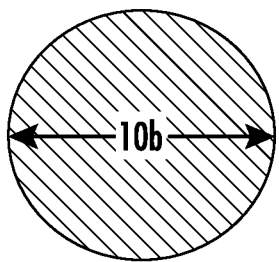
FIG. 2 is a cross sectional view of the hook in FIG. 1A, taken along lines 2-2.
Figure 3A:
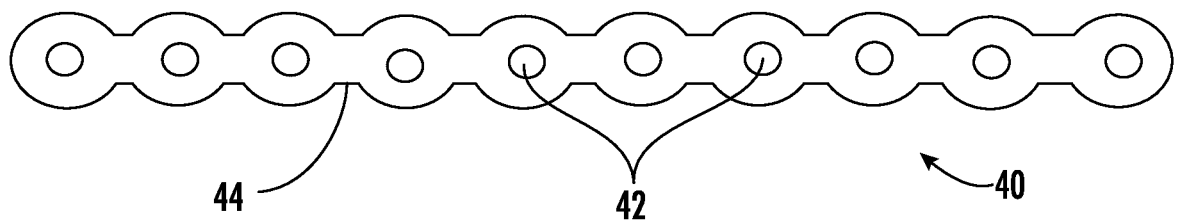
FIGS. 3A-B are front elevation views of two strap embodiments suitable for use with the hook in FIG. 1A.
Figure 3B:
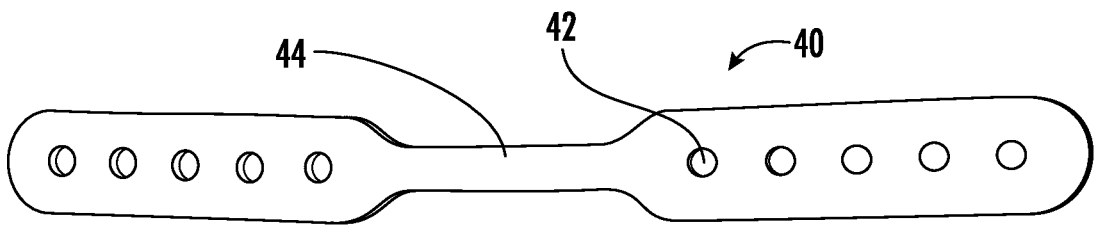

An insulated blanket hook or hook according to the invention 100 is shown in FIGS. 1A-B, FIG. 2 shows a cross section of the hook in FIG. 1A taken along lines 2-2, FIGS. 3A-B showing two typical strap 40 embodiments for use with the hook 100, and FIGS. 4A-C showing various representative uses of the hook 100 and strap 40 with a prior art blanket or blanket 30. FIGS. 5A-C show some examples of prior art blanket, clamps and representative use on three dimensional high voltage equipment.

Turning to FIGS. 1A-B, the hook 100 is an insulated body having a straight segment or shank 10 between a first bend 12 and a second bend 14. In the Figures, the bends 12 14 are shown as having an approximately same shape and symmetry but positioned on opposed sides of the shank 10. The inventor notes that the bends 12 14 can also be configured with different relative sizes, shapes and positions along the shank 10, as needed or desired. The insulated body in the Figures is an S-shaped body with a proximal end 18a and a distal end 18b, with a shank center 10a equidistant between the two ends 18a 18b. The first bend 12 is formed between the shank center 10a and the proximal end 18a, shown in FIGS. 1A-B with the proximal end 18a on a left side of the S-shaped body. The second bend 14 is similarly formed between the shank center 10a and the distal end 18b, bending towards a right side of the S-shaped body. Each bend 12 14 is further defined by a throat opening length or gape 16 measured from the shank 10 to the proximal end 18a, in the case of the first bend 12, and from the shank 10 to the distal end 18b for the second bend 14. Each bend 12 14 creates a throat 28 portion of the hook 100 measured from the bend 12 14 to its closest end 18a 18b. A hook width 20 of the hook 100 measures the s-shaped body from its outermost dimensions in FIG. 1A. Looking at FIG. 1A, the hook 100 is an "open-style" S hook, where the proximal end 18a and the distal end 18b do not curve inwards towards the shaft 10. A conical tip 18 is positioned at each of the proximal and distal ends 18a 18b with a base portion of the conical tip 18 having a larger diameter than a cross sectional width 10b of the S-body taken along lines A-A.

The representative hook 100 shown in FIGS. 1A-B has the following approximate dimensions:
Hook length 22: 6.25 inches
Throat 28: 5.5 cm
Hook width 20: 3.6 inches
Gape 16: 0.75 inches
Cross sectional diameter 10b: 0.5 inches
Height of conical tip from base to tip: 0.78 inches The inventor notes that the hook 100 can be sized up or down as desired, and a smaller sized hook, up to 30% smaller than the representative hook shown in FIGS. 1A-B, may also be useful, however generally speaking, the smaller the hook, the more difficult it becomes to manipulate while wearing gloves and thus less useful to a lineman. Substantially larger hooks have some use however a base width of the conical tip 18c must be sized small enough such that it can be forced into an aperture 32 of a prior art rubber blanket 30 and the base be large enough that the hook 100 is secured therein.

The cross-sectional shape of the S-shaped body, taken in FIG. 1A along lines 2-2, and shown in FIG. 2 approximates a circle, and the inventor notes that this body shape is designed to be about a same or slightly smaller shape and size of the aperture 32 of the blanket 30, shown in FIGS. 5A-C, or at least a shape and size that can be inserted and removed from the aperture 32 and yet provide a snug fit when inserted therein. The inventor notes that a variety of cross sectional shapes can be used, including irregular or asymmetrical cross sections for the hook body, however cross sectional shapes having non-rounded corners such as square or triangular shapes are less desirable as the corners are likely to damage the aperture 32 with repeated insertion/removal of the hook 100.

The hook 100 is made of a strong, non-conductive, insulating material, such as PVC or other insulative plastic material, fiberglass, nylon, etc. The embodiment shown in Figures has a tubular body shape featuring a solid core for strength. The straight shank 10 shown in FIG. 1 has a uniform diameter between the flaring base of the pair of conical tips 18c, however the inventor notes that the shank 10 can be configured with varying diameters for strength or even to enhance handling by the lineman, such as finger grip indentations. A wider center 10a, for instance, could be incorporated for increased strength and durability. The inventor notes that there are many other useful embodiments of his hook 100, including an embodiment where the first bend 12 and the second bend 14 are asymmetrical, with a larger gape 16 or throat 28 for instance. Other useful embodiments include adding additional bends, creating a closed style gape, excluding one or both conical tips 18c, or including closed loops within the hook body, to allow the use of hot sticks (not shown) and other equipment commonly used by linemen.

FIGS. 3A-B show an insulated strap 40 having two or more holes 42 formed therein and shown with a strap ease segment 44 to allow the strap 40 to stretch, with FIG. 4A showing the use of a single blanket 30 secured to itself with the hook 100. FIGS. 4B-C show the use of one strap embodiment with the hook 100 and the blanket 30. The strap 40 shown in FIG. 3A has a scalloped perimeter with ten holes 42 formed therein, with the representative strap shown having a strap length of about 20 inches. The inventor notes that the hole arrays shown are representative and not meant to limit the holes 42 to the numbers shown or to the specific arrangement in the Figures and the strap 40 can be shorter, longer, a different overall shape, or have fewer holes 42, for instance, depending on the desired application. For instance, the scalloped edge strap shown in FIG. 3A would work equally well by eliminating every other hole 42. The strap 40 is typically made of rubber for its durability, flexibility, and non-conductive properties, but any material having those characteristics would be suitable for use with the strap 40. The holes 42 are sized and shaped to fit the hook 100 and used to secure the blanket 30 around an irregularly shaped or large piece of equipment as measured relative to the size of the blanket 30 to better secure the blanket 30 with the hook 100.

To use the hook 100 with the prior art blanket 30 and its apertures 32, a circumference of the equipment to be covered is first evaluated. In cases where the blanket 30 is sufficiently sized to cover the equipment, a single blanket can be secured to the equipment using hooks pushed into the apertures 32 of the blanket 30. In other cases, the entire equipment circumference must be covered and may require multiple blankets joined together using strap and hooks or just hooks. In still other cases, if the equipment can be safely insulated by securing the blanket to one side only, one or two blankets could be attached to one another using the hook 100 and the remaining sides joined using a combination of hooks and straps, as desired. In some applications, linking the first bend of one hook to a second bend of another hook can work to successfully and safely secure the non-blanketed sides together and hence many different hook, strap and blanket combinations are possible using this method.

FIGS. 4B-C show representative use of the strap 40 with the hook 100, where the hook 100 and strap 40 used together allow the blanket 30 to be secured around objects whose outermost dimensions are greater than those of the blanket 30. The inventor is unaware of any other prior art equipment or method of using such equipment that secures the blanket 30 in these situations. Typically, the prior art method of covering irregularly shaped or very large equipment is to clamp multiple blankets 30 together using a blanket pin 34, but this method is less than secure and exposes the linemen to danger.

FIG. 5C shows the blanket 30, the apertures 32 and the prior art blanket clamp pin or clothespin or blanket pin 34, and FIGS. 5A-B, show two common ways the blanket 30 and the blanket pins 34 are used in high-voltage settings. The inventor notes that the blanket pins 34 secure a portion of the blanket to another portion of itself or to the covered equipment or line itself, with no other options for securing the blanket 30. The blanket 30 is typically sold with a series of uniformly spaced apertures 32 along two or more edges of the blanket 30, with a representative blanket shown in FIG. 5C made by Honeywell International of Charlotte, N.C. USA and sold under the Salisbury brand of safety products. The blanket pin 34 shown is also a Salisbury brand item, and is a spring clamp used to pinch portions of the blanket 30 together, as shown in FIGS. 5A-B. Note that the blanket pin 34 in the Figures does not use the apertures 32 through which to secure the blanket 30 but rather grabs loose portions of the blanket 30 itself, relying on the blanket's relatively larger size as compared to the equipment covered as a way to ensure the blanket pin 34 will have sufficient material to clamp together. The apertures 32 are not used by linemen, and the inventor, who is a lineman, has noted that insulated gloves worn and needed to perform the work limit his fine motor skill ability, hence the apertures 32 are often ignored because the lineman cannot easily or quickly thread cord or anything else through the apertures to otherwise secure the blanket 30 using these holes with currently available equipment. The blanket pins 34 are relatively strong spring clamps but in high wind situations, or when attempting to secure the blanket 30 to irregularly shaped items, the blanket pins 34 have difficulty securing the blanket 30. The inventor notes that the blanket pins 34 have rubber tips that are meant to provide more secure grip against the rubber blanket 30, however are too large to insert into the apertures 32 primarily because the blanket pins 34 were never designed to secure the blanket 30 through the apertures 32. The apertures 32 are traditional but currently not particularly functional.

The advantages of the hook 100 and strap 40 are clear when the prior art use of the blanket pins 34 and blanket 30 in FIGS. 5A-C are compared to use of the hook 100 and/or strap 40 with the blanket 30 in FIGS. 4A-C. The hook's size and shape allow the lineman to easily manipulate the hook 100 into the apertures 32 to secure the blanket 30 while wearing protective gloves, and the hook 100 and strap 40 design allow multiple blankets 30 to be secured together, or to allow a single blanket 30 to be secured around a relatively large piece of equipment in situations where the prior art blanket pin 34 would not permit. A lineman could carry or store several open blankets by pushing one end of the hook 100 into an aperture 32 of each blanket 30 and then hooking the open end onto a convenient structure. In FIG. 5A, the uppermost blanket pins 34 securing the blanket 30 along a middle portion thereof to a girder is a typical use of the blanket pins 34. The blanket pins 34 along the edge of the blanket 30, where the apertures 32 are formed, serve no purpose other than to prevent the blanket 30 from flapping in the wind, and this use of the blanket pins 34 is less desirable and often omitted by the lineman because the blanket pins 34 do not perform this function well. The hook 100 and embodiments thereof are ideally suited to this task, as the apertures 32 are pre-existing and already aligned, permitting the hook 100 to provide a simple, secure and streamlined way to ensure the blanket edge remains secure and in a protective position.

In FIGS. 5A-B, the equipment covered by the blanket 30 is shaped so as to permit the blanket pins 34 to be clamped directly around the blanket 30 and/or to the equipment itself; if the equipment were shaped like the object in FIG. 4B for instance, whose width is beyond the capacity of the blanket pin 34, and is wider than the blanket 30, there is no easy way to secure the blanket 30 of the size shown to the object, thus requiring the lineman to have an assortment of blanket sizes to attempt to clip together. The inventor's hook 100 and strap 40 however provide additional flexibility and thus reduce the equipment needed to perform the job safely and allow for equipment simplicity. Instead of carrying several blankets 30 of different sizes, multiple blankets of a single size can be used and simply connected using hooks 100 and straps 40 as needed. The hook 100 shape and material are durable, with the hook 100 resistant to twisting. Use of the pre-existing apertures 32 in the blanket 30 provide additional useable blanket length and reproducible securing while enhancing lineman safety. Unlike blanket pins 34, which can be jerked off the blanket 30 if the blanket 30 is agitated as may be the case in high wind situations, or when the spring clamp weakens due to normal wear and tear, the hook 100 and strap 40 can only be dislodged by the lineman's deliberate manipulation. The hook 100 and strap 40 are inexpensive and durable and can easily be hooked onto a pocket or belt so as to be within easy reach of the lineman.

It is to be understood that the above-described arrangements are only illustrative of the application of the principles of the present invention. Numerous modifications and alternative arrangements may be devised by those skilled in the art without departing from the scope of the present invention. The inventor stresses that the representative embodiment shown in the Figures is simply one particularly useful embodiment and that other hook configurations are also contemplated by this disclosure. A C-shaped hook for instance, where the proximal and distal ends 18a 18b curve towards one another and the first and second bends 12 14 are on a same side of the shank 10, as opposed to opposite sides as in the case of the S-shaped hook, is another embodiment of the inventor's insulated hook 100. The C-shaped hook could have conical tips 18c or a combination of straight and conical tips 18c as desired or needed. The inventor notes too that the flaring base of the conical tip 18c, shown in the Figures as uniformly flaring outwardly from the hook body, could in fact have an irregular shape with only a portion of the base flaring outwardly, or the outwardly flaring base is not uniformly sized and shaped, to limit the manual stretching required of the apertures 32 to install or remove the hook 100. The inventor stresses that his insulated hook 100 combines security, reproducible results, and ease of use in a tool that is durable, simple to manufacture, easy to carry on the job, and requires no manual dexterity of fingers while wearing insulated gloves. The hook is quick to install or remove and the material, in the case of the embodiment shown in the Figures, is made of smooth nylon 6.6 material for strength, durability, high heat resistance and superior insulating properties. Nylon 6.6 has low creep, good stretch recovery, low weight and higher abrasion resistance as compared to Nylon 6 and the inventor believes this results in a reliable, long-lasting insulating hook. With its low cost to manufacture, the inventor believes his hook 100 can become standard equipment for sale alongside the prior art blankets and a lineman will typically own multiple hooks and carry them to each job.

I claim:

1. An insulated hook for use with a rubber blanket formed with at least two apertures formed in an outermost edge of the blanket, the hook and blanket used for protecting linemen working with high voltage equipment, the hook comprising:
    a hook body having a proximal end and a distal end, with the hook body shaped form a first bend towards the proximal end and a second bend towards the distal end, the first and second bends separated by a shank of the hook body;
    wherein the first bend and the second bend each have a gape having a predetermined width;
    wherein the hook body is further comprised of a hook width, a hook length, a hook diameter and a cross-sectional shape; and
    a conical tip formed at each of the proximal end and the distal end of the hook body, the conical tip having a base with a diameter larger than the hook diameter;
    wherein the hook body is made of a non-conductive material; and
    wherein the conical tips of the hook body are adapted to be removably positioned inside the apertures of the blanket.

2. The hook in claim 1, wherein the gape of the first bend and the second bend are a same size.

3. The hook in claim 2, wherein the gape is 0.75 inches.

4. The hook in claim 3, wherein the base of the conical tip is less than half the diameter of the hook body.

5. The hook in claim 1, wherein the cross-sectional shape of the hook body is at least one of symmetrical and asymmetrical.

6. The hook in claim 5, wherein the cross-sectional shape of the hook body has rounded edges.

7. The hook in claim 1, wherein the hook body is an S-shaped body where the first bend is positioned the proximal end on one side of the shank and the second bend is positioned on an opposed side of the shank.

8. The hook in claim 1, wherein the hook body is a C-shaped body and the first bend and the second bend are on a same side of the shank.

9. The hook in claim 1, wherein the hook body is made of Nylon 6.6.

10. A method of temporarily insulating high voltage equipment using rubber blankets formed with a plurality of apertures around an edge of the blankets, insulated hooks each having a first bend and a second bend, and one or more rubber straps having apertures, the method comprising the steps of:
    identifying the high voltage equipment requiring temporary electrical insulation;
    approximating a circumference of the equipment by visually evaluating a number of blankets, straps and hooks needed to encircle the equipment to a sufficient level to safely insulate the equipment;

selecting a first blanket and wrapping the blanket around the equipment;

positioning the first bend of the hook inside an aperture of the first blanket;

positioning the second bend of the hook inside at least one of a second aperture of the first blanket, an aperture of a second blanket, and an aperture of the strap; and repeating the steps until the equipment is sufficiently enclosed by the straps, blankets, and hooks so as to minimize electrical danger.

11. The method in claim 10, wherein the first blanket is further formed with a proximal edge and an opposed distal edge, and the step of approximating uses only the first blanket and at least two hooks.

12. The method in claim 10, wherein the first blanket is further formed with a proximal edge and an opposed distal edge, and the step of approximating uses only the first blanket and at least one strap and at least two hooks.

* * * * *